July 7, 1964
R. M. KUTS
3,140,213
HOSE MAKING METHOD
Filed July 2, 1959
3 Sheets-Sheet 1
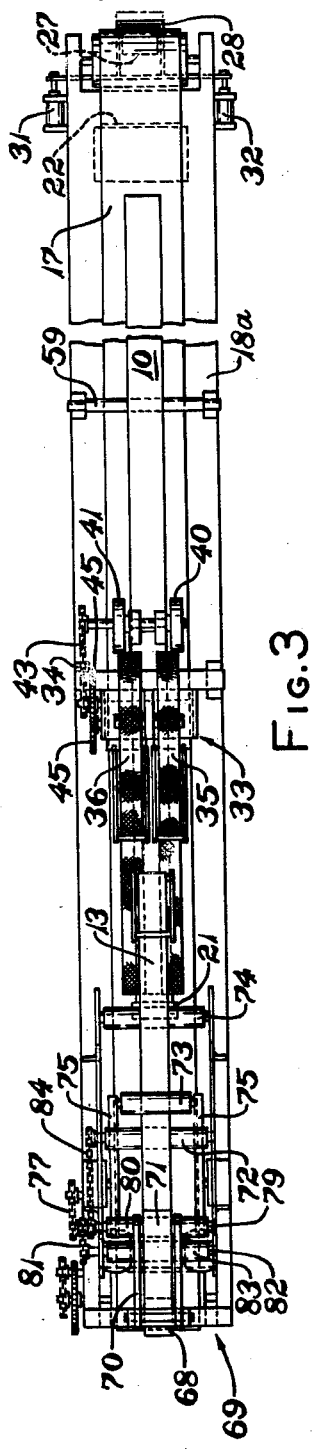
INVENTOR.
RICHARD M. KUTS
BY
W. A. Shira Jr.
ATTY.

July 7, 1964  R. M. KUTS  3,140,213
HOSE MAKING METHOD
Filed July 2, 1959  3 Sheets-Sheet 2
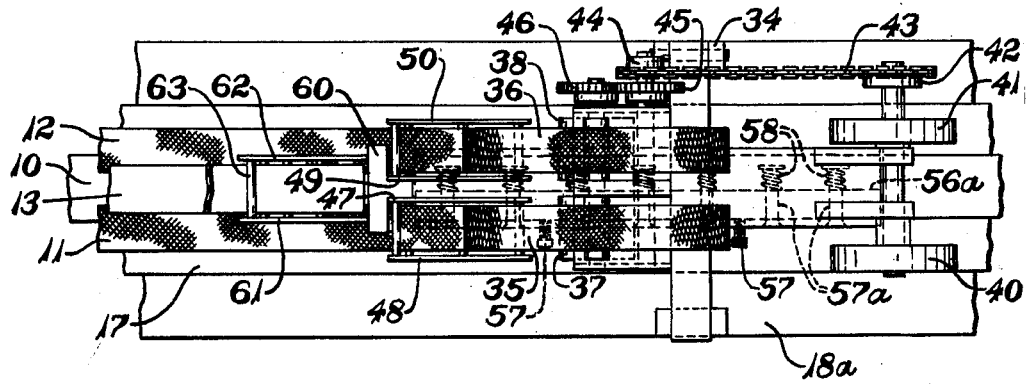
Fig. 4
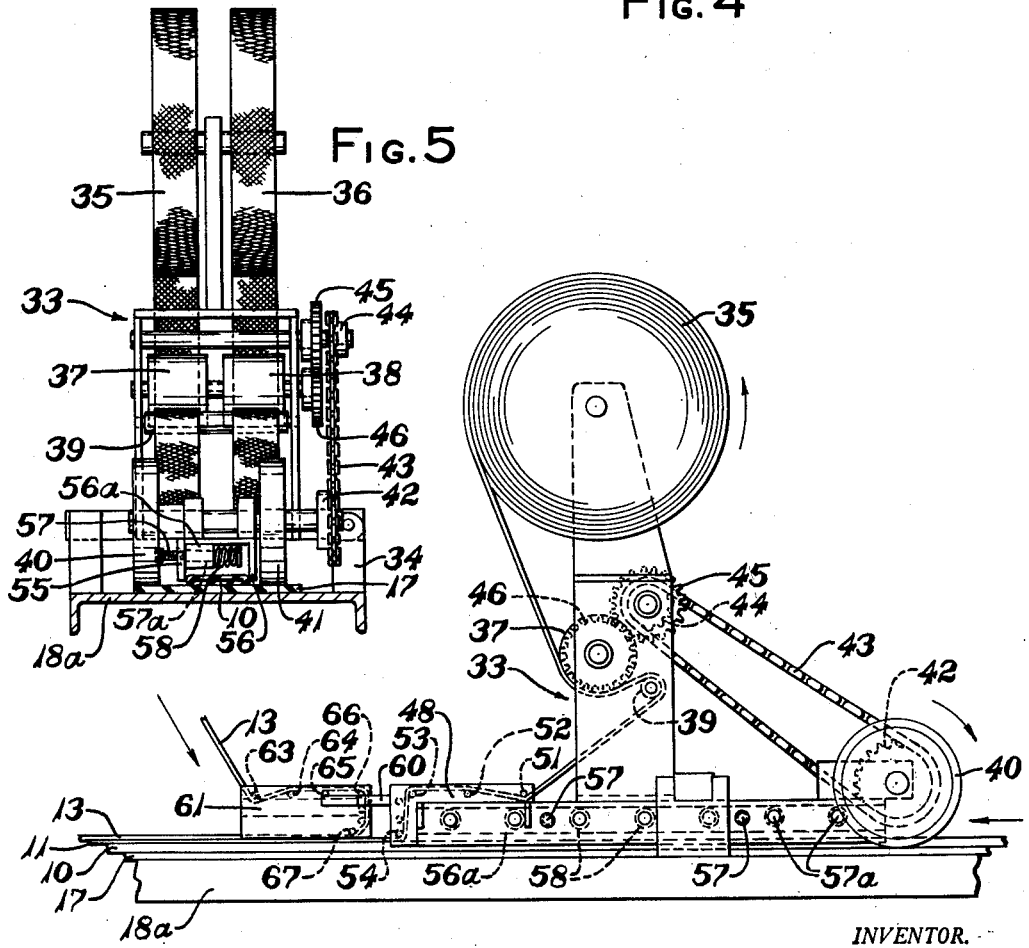
Fig. 5
Fig. 6
INVENTOR.
RICHARD M. KUTS
BY
ATTY.

July 7, 1964    R. M. KUTS    3,140,213
HOSE MAKING METHOD

Filed July 2, 1959    3 Sheets-Sheet 3

INVENTOR.
RICHARD M. KUTS
BY
ATTY.

United States Patent Office 3,140,213
Patented July 7, 1964

3,140,213
HOSE MAKING METHOD
Richard M. Kuts, Akron, Ohio, assignor to The B. F. Goodrich Company, New York, N.Y., a corporation of New York
Filed July 2, 1959, Ser. No. 824,650
6 Claims. (Cl. 156—202)

This invention relates to a method for making hose of the type comprising an elastomer lining tube and a fabric cover so interconnected that the hose may be flattened in cross section when not in use. The apparatus herein disclosed for practicing the method is claimed in my copending divisional application Serial No. 336,993, filed January 10, 1964.

It is highly desirable that hose employed for fire fighting and like operations be capable of compact storage without sacrifice of strength. One type of hose which is especially satisfactory in this respect employs a fabric cover or jacket with an elastomer lining tube, the hose being so made that, when not in use, diametrically opposite walls substantially contact thereby facilitating handling and storage of the hose. This is achieved by adhering the elastomer lining tube to the fabric covering jacket only along two longitudinally extending diametrically opposite regions with the areas between these regions not adhered and comprising the curved sides of the flattened hose. The desired selective adherence and the requisite strength of the construction is achieved by placing fabric reinforcing strips over the curved edges of the flattened, uncured elastomer lining tube and strips of uncured elastomer on the flattened portions of the lining tube before the jacket is applied and the hose is cured so that the curved edges are reinforced to withstand flexing and do not adhere to the covering or jacket.

The manufacture of a hose of the type described is normally effected in lengths of 50 feet or more and has heretofore been accomplished by a series of manual operations performed by the workers as they walk back and forth along a work table the length of the hose section being constructed. This is not only a slow and tiring procedure but also is susceptible of many defects in the product since it is difficult to manually handle the long strips of materials and assemble them in the proper relationship without wrinkles, or irregularities in the amount of overlap of the edges of the strips.

The principal object of this invention is to provide an improved method by which a hose of the type described can be manufactured more rapidly and with fewer defects by guiding the several elongated strips of material into the desired assembled relationship upon the lining tube as the latter is moved relative to the location where strip application occurs.

Another object of the invention is to provide a method for manufacturing a hose of the type described wherein the accuracy and speed of manufacture is substantially independent of the skill and extent of physical exertion of the operator.

Further objects and advantages of the invention will be apparent to those skilled in the art to which the invention pertains from the following description of a preferred embodiment described with reference to the accompanying drawings, forming a part of this application, in which:

FIG. 1 is a transverse sectional view of a hose lining tube with the several reinforcing and adhesion-promoting strips applied thereto in accordance with this invention;

FIG. 2 is a side elevational view of apparatus for performing the method of the invention;

FIG. 3 is a top plan view of the apparatus shown in FIG. 2;

FIG. 4 is an enlarged top plan view of the strip applying mechanism portion of the apparatus shown in FIGS. 2 and 3;

FIG. 5 is an end view of the mechanism shown in FIG. 4 as seen from the right-hand side of the latter figure;

FIG. 6 is a side elevational view of the mechanism shown in FIGS. 4 and 5;

Figure 7:
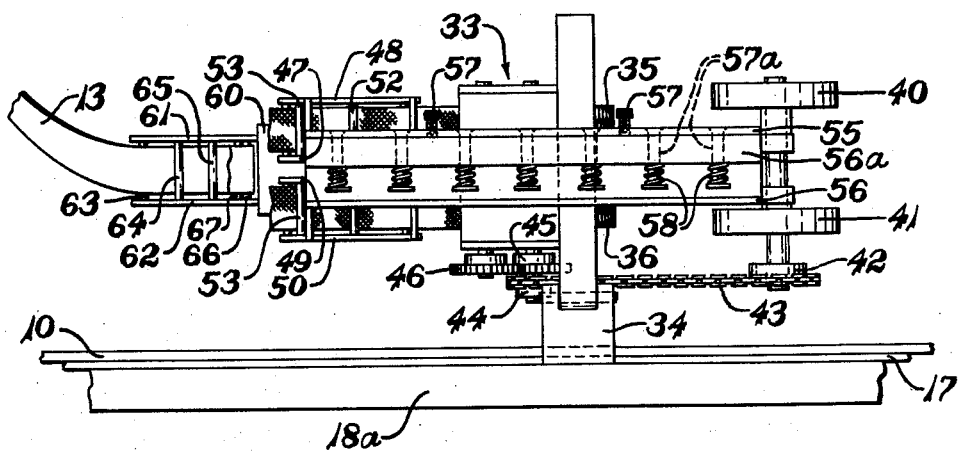
FIG. 7 is a side view of the mechanism shown in FIGS. 4 to 6 but with the strip applying mechanism tilted 90° to show the bottom thereof.

A hose without its outer covering or jacket, manufactured by the procedure of this invention, is illustrated in FIG. 1 of the drawings as comprising an elongated lining tube 10 of elastomeric material which is transversely flattened thus providing longitudinally extending edge portions which are covered by fabric strips 11 and 12. The adjacent edges of these strips are spaced from each other and the intervening upper and lower region of the tube 10 are covered by thin strips 13 and 14 of elastomeric material, such as gum rubber, with the edges of these elastomer strips overlapping the adjacent edges of the fabric strips. The fabric strips 11 and 12 employed are preferably of the cross woven type and are cut on the bias so that the cords of the fabric extend at angles relative to the length of the tube 10. The surfaces of the fabric strips 11 and 12 adjacent the tube 10 are preferably provided with a coating of elastomer while the outer surfaces of these strips are free of such a coating. Consequently, when the liner with fabric and strips of elastomer, as shown in FIG. 1, is inserted in a woven tubular cover or jacket and then subjected to heat and pressure, the jacket is adhered in the region of the elastomer strips 13 and 14 but is not adhered in the regions of the strips 11 and 12. This permits the hose to assume full circular cross section when in use for conveying liquid while freely permitting flattened condition when the hose is not in use and has been drained.

In accordance with the procedure of this invention, a hose of the type illustrated in FIG. 1 is assembled by moving a flattened, uncured, rubber lining tube 10 past a work station where two spaced strips of fabric 11 and 12 are applied to the moving tube with the adjacent edges of the strips spaced from each other and extending outwardly beyond the longitudinal edges of the tube. Adherence of the strips to the tube may be facilitated by the application of an adhesive, such as rubber cement, to the upper surface of the tube prior to application of the fabric strips.

Immediately after the tube 10 receives the fabric strips 11 and 12, a strip of elastomeric material 13 is progressively applied to the moving tube and fabric strips. The assembly is then inverted and has the appearance as seen at the right-hand portion of FIG. 8.

An adhesive, such as rubber cement, is then preferably applied to the now upper surface of the tube 10 and the extending edges of the fabric strips 11 and 12 are folded about the tube, this being facilitated by suitably shaped curved sheet metal folding guide members 15 and 16 which engage the strips 11 and 12 and direct them laterally about the tube 10. The folding is completed by the travel of the tube and strip assembly over a convex surface such as the head pulley of the conveyor on which the tube is carried. A strip of elastomer is then applied to the adjacent edges of the folded fabric strips and the intermediate portion of the tube 10 as the assembly moves past the work station. Finally, the completed tube is removed, inserted in a fabric jacket and cured.

The application of the fabric strips and the strips of elastomeric material are effected in accordance with the speed of travel of the lining tube 10 and are mechanically guided in a manner such that the proper lateral disposition of the strips is maintained with an accuracy not heretofore possible. Moreover, the strips are applied under substantially no longitudinal tension so that the completed article does not have inherent inequalities of strength or variable stresses which result in a defective product.

FIGS. 2–7 illustrate the presently preferred form of an apparatus for manufacturing hose in accordance with the above-described method. This apparatus comprises an endless conveyor 17 of the belt type supported for movement in a substantially horizontal plane by a suitable framework 18. The upper flight of the conveyor is preferably supported upon a rigid, planar surface, such as the back of a channel iron 18a of the supporting framework, with the conveyor extending about a driven head pulley 19 and a non-driven tail pulley 20 located adjacent the opposite ends of the frame.

The conveyor 17 is provided with a means 21 for securing or clamping thereto one end of an uncured hose lining tube 10. This means may comprise a sheet metal plate or bracket fastened at one end to the conveyor belt 17 with the free end of the plate or bracket spaced from the belt sufficiently to permit resilient gripping of an end of the tube 10 slipped thereunder. This permits the lining tube 10 to be positively carried by the conveyor without slippage.

The hose lining tube 10 is supported, as it is pulled along the lower flight of the conveyor 17, by a second endless conveyor 22 which is supported upon the framework 18 in vertical alignment beneath the conveyor 17. The conveyor 22 is driven in timed relationship with the conveyor 17 through intermeshing gears carried upon the shafts of the head pulley 19 for conveyor 17 and the head pulley 23 of the lower conveyor 22. A common drive for both conveyors 17 and 22 is provided by an electric motor 24 which is under control of the operator through selective actuation of start and stop switches 25 and 26 located at a convenient position upon the framework 18.

The apparatus includes a means for selectively applying adhesive to a lining tube 10 as it is carried by the conveyors. As here shown, this means comprises an applicator roll 27 rotatable in a container or trough 28 for the adhesive with the container and roll movably mounted upon the framework 18 for selective positioning from a non-operative position in spaced relationship from the conveyor, as indicated in dotted lines in FIG. 2, into operative position with the applicator roll contacting liner tube 10 as it moves therepast, as shown in full lines in FIG. 2. The mechanism for effecting this movement is under control of the operator through selective actuation of start and stop buttons 29 and 30 located on the framework 18 at a convenient position, preferably adjacent the control switches 25 and 26 for the conveyors. In the illustrated embodiment, the means for moving the adhesive applicator comprises a pair of fluid pressure operated motors, such as cylinders 31 and 32, to which fluid pressure is supplied for movement in a selected direction by suitable electrically actuated valves, not shown, controlled by the aforementioned buttons 29 and 30.

The mechanism for applying the fabric strips 11 and 12 comprises a supporting structure 33 which is pivoted about a horizontal axis upon a bracket 34 secured to the framework 18 adjacent one side of the conveyor 17 at the work station of the apparatus. The upper portion of the supporting structure 33 removably rotatably supports two spaced supply rolls 35 and 36 of fabric material in strip form. This material, which forms the strips 11 and 12, is, as previously described, preferably provided with an elastomer coating on the surface which is to contact the tube 10. Hence, this material, when disposed in roll form, tends to resist unrolling because of the tackiness of the elastomeric coating and the contact thereof with the uncoated surface of the material in the convolutions of the roll. It is, therefore, necessary to exert force upon the material to remove it from the supply rolls but it is preferable that the material be supplied to and applied on the traveling tube 10 without being under appreciable tension at the time of application in order to prevent distortion and improper alignment. These conflicting requirements are met in the illustrated apparatus by the provision of separate stripper rolls 37 and 38 for the material supply rolls 35 and 36, respectively, which stripper rolls are so positioned and driven as to remove material in accordance with the need for a tensionless feeding thereof without requiring the attention of the operator.

The nature of this portion of the apparatus will be best understood from a consideration of FIGS. 2 to 6 which show that the supporting structure 33 has a separate guide roll, such as 39, rotatably mounted beneath and spaced from each supply roll 35 and 36 with the stripper rolls 37 and 38 rotatably supported on the structure 33 at one side of a plane passing through the axes of the corresponding supply and guide rolls. The construction is such that the strip of material passing from a supply roll, such as 35, contacts the associated stripper roll 37 only when tension is exerted thereon through removal of slack therefrom. Since the stripper roll is driven, as hereinafter described, contact of the fabric strip therewith causes the former to pull the latter and free sufficient of it from the supply roll until a loop is formed of sufficient size so that driving contact with the stripper roll is lost whereupon no further material is stripped from the supply roll until the surplus material, represented by the loop thereof, has been utilized.

Preferably, the rate of rotation of the stripper rolls 37 and 38 is faster than the rate of travel of the conveyor 17 and is controlled by movement of the latter. This is effected in the illustrated embodiment by a friction drive comprising a pair of rubber covered wheels 40 and 41 rotatably mounted upon the supporting structure 33 and engageable with the surface of the belt 17. The axle of the wheels 40 and 41 is provided with a sprocket 42 about which is trained a chain 43 that also passes in driving relationship about a sprocket 44 upon a shaft which is provided with a gear 45. The gear 45 meshes with a gear 46 on the common shaft of the stripper rolls 37 and 38. Hence, the stripper rolls are continuously driven whenever the wheels 40 and 41 are in contact with conveyor 17 and the latter is operating.

The strip material from the supply rolls 35 and 36 is led from an associated guide roll between spaced, vertically extending, side-guiding plates 47, 48 and 49, 50, respectively, see FIG. 4. Each pair of plates 47, 48 and 49, 50, rotatably support therebetween a plurality of strip guiding and direction changing rollers, such as 51, 52, 53 and 54. As seen in FIGS. 4 and 6, these rollers direct the strip material coming from the guide roll 39 into proper parallel relationship with respect to the lining tube 10 and into contact therewith so that one longitudinal edge of each strip engages the tube 10 adjacent an edge of the latter and the other edge of the strip extends beyond the tube edge and rests upon the surface of the conveyor belt 17.

The strip supplying mechanism just described also includes a provision for guiding the hose lining tube 10 in its travel with the belt 17 so that proper alignment is maintained between the hose and the strip material being applied from the rolls 35 and 36. Thus, the supporting frame 33 of the fabric strip applying mechanism includes, on its lower surface, spaced vertically extending plates 55 and 56 adapted to extend on either side of the edges of the tube 10, as will be apparent from FIG. 5, and prevent lateral misalignment of the tube during its travel. The space between the plates 55 and 56 may be adjusted to accommodate tubes of different widths by means of a plurality of adjusting bolts, such as 57, which are threaded in plate 55 and engage an enlarged portion 56a carried by an integral flange of plate 56. The plate 55 has studs 57a connected thereto which extend through openings in the portion 56a. The outer ends of the studs 57a may be headed and between the heads and the portion 56a are springs 58 to thereby urge the plate 55 toward the plate 56. The strip guides, comprising the pairs of spaced plates 47, 48 and 49, 50, are preferably supported upon the plates 55 and 56, respectively, so that adjustment for different widths of hose liner simultaneously adjusts the distance between the fabric strip guides so that the strips are applied at the proper locations on the lining tube 10.

Proper travel of the hose lining tube 10 between the guide plates 55 and 56 of the strip applying mechanism is facilitated by lifting the tube above the surface of the belt adjacent the point where it begins its passage between the guide plates 55 and 56. This is effected by means of a transversely extending bar or roller 59 supported upon the framework 18 of the apparatus, this support being preferably in the form of a pivot adjacent one end so that the bar or roller 59 may be moved out of the position shown in the drawings if desired. The function of the bar or roller 59 is to free the hose lining tube 10 from frictional contact with the surface of the belt 17 thus facilitating lateral shifting of the tube relative to the belt if required by the side guiding plates 55 and 56.

The fabric strip applying mechanism is provided adjacent its forward end with a projecting supporting bar or member 60 to which is attached the guiding mechanism for application of a strip of elastomer, such as 13 and 14, to the hose lining tube. This guiding mechanism is constructed similar to the guiding mechanisms for the fabric strips and comprises vertically extending plates 61 and 62 rotatably supporting transversely extending guide rollers, such as 63, 64, 65, 66 and 67. Thus, the strip of elastomer is guided in the path shown in FIG. 6, so that it is applied to the tube 10 and the edges of the strips 11 and 12 adjacent the work station of the machine and spaced forwardly of the point of application of the fabric strips. The lower portion of the guiding means for the strip of elastomer may be provided with vertical guiding surfaces for the tube 10, which are adjustable relative to each other, in a manner similar to that which has been explained for the guide plates 55 and 56.

The elastomer which comprises the strips 13 and 14 on the hose is normally supplied as strip gum rubber helically wound with an interposed cloth liner. A supply roll 68 of such material is removably rotatably mounted upon a suitable support, somewhat schematically indicated at 69 in the drawings. As here shown, the support 69 has an arm 70 pivoted thereon the outer end of which removably journals the axle of a liner take-up roll 71 on which the liner from the supply roll 68 is wound as the strip of elastomer is removed from the supply rool. The roll 71 rests upon and is rotated by drive rolls as hereinafter described. The strip of elastomer is led from the supply roll 68 over a driven stripping roll 72 and into a downwardly extending loop in which is supported a dancer roll 73. The strip then extends upwardly over a guide roll 74 and thence downwardly beneath the guide roll 63, of the strip guiding mechanism, and about the guide rolls 64–67 which direct the strip into contact with the hose tube liner 10 and the fabric strips 11 and 12.

The dancer roll 73 is supported on the end of a pivoted, counterbalanced arm 75 and the movement thereof is employed to actuate a limit switch, not shown, for controlling the driving of the stripper roll 72 and the take-up roll 71. The power for driving these rolls is provided by an electric motor 76 which drives a power transmission element 77 through a change speed mechanism 78. In the embodiment shown, the element 77 is a chain which passes over a sprocket connected on a shaft 79 provided with a roll 80. The shaft 79 is provided with a second sprocket which drives a chain 81 extending about a sprocket on shaft 82 located adjacent and parallel to the shaft 79. The shaft 82 is likewise provided with a roller 83 which cooperates with the roller 80 to form a support and frictional drive for the wind-up roll 71 by engaging the periphery of the latter which freely rests upon the rollers 80 and 83 due to the weight of gravity and the pivotal mounting of the arm 70. The shaft for the stripper roll 72 is extended at one end and provided with a sprocket about which is trained a chain 84 that extends about a sprocket on the shaft 79.

The construction of the apparatus just described is such that the travel of the belt 17 carrying the liner tube 10 causes the strip of elastomer to be fed into contact with and adhered to the tube 10 since the strip material is tacky and is contacted with the tube under light pressure. Hence, as the conveyor 17 moves the hose liner tube, the strip of elastomer, forming the strip 13 or 14 on the hose lining tube, is withdrawn from its source of supply thereby descreasing the vertical extent of the loop in which the dancer roll 73 rides. This roll exerts substantially no weight upon the material, due to the counterbalanced mounting thereof, but is free to follow variations in the dimensions of the loop of the strip material. When the depth of the loop is at a predetermined minimum, the above-mentioned limit switch controlling operation of motor 76 is closed starting the motor thus causing rotation of the wind-up roll 71 and the stripper roll 72. Hence, the liner and the strip of elastomer are withdrawn from the supply roll 68 and are separated from each other with the liner being re-wound upon the roll 71. The rates of operation of the stripper roll 72 and re-wind roll 71 are such that the strip of elastomer is withdrawn from the supply roll 68 faster than is needed by the advancing tube 10. Preferably, the stripper roll is operated at a linear speed in excess of that of the liner re-wind roll and the speed of the latter is somewhat faster than that of the conveyor. Hence, the depth of the loop in the strip of elastomer increases, when the stripper roll 72 is driven, until the counterweighted arm or lever 75 drops to a position opening the limit switch and stopping the motor 76. This operation continues automatically as the strip of elastomer is applied to a hose lining tube on the conveyor 17.

*Operation*

The mode of operation of the apparatus will be readily apparent from the following description of the steps performed in the procedure of preparing a liner tube with fabric and strips of elastomer so that the product is like that shown in section in FIG. 1. In preparing the apparatus for such an operation, rolls 35 and 36 of fabric strip material are placed upon the supporting structure 33 and the ends of the strips are led over the stripping rolls 37 and 38 and about the guide rolls 39, 51, 52, 53 and 54 so that the strip material is presented in a horizontal plane adjacent the end of the guides 47, 48, and 49, 50. The strip of elastomer material is provided in the form of a supply roll 68 with an interposed liner which is supported and separated, as shown in FIG. 2, with the elastomeric material passing about the rolls 72, 73 and 74, through the guiding plates 61 and 62, and about the guide rolls 63, 64, 65, 66 and 67 so that the end of the strip is disposed in substantially a horizontal plane in advance of the edges of the fabric strips. With the apparatus thus supplied with the several materials in strip form, the strip applicator and guiding mechanism are swung about its pivotal support to inoperative position as shown in FIG. 7.

The end of a flattened, uncured hose liner tube 10 is now secured to the upper surface of the belt 17 by the clamp 21. The operator then presses the start button 25 and the start button 29. The first of these energizes the conveyor motor 24 so that the conveyors 17 and 22 are placed in operation. The second of these start buttons, namely 29, actuates the electrically controlled fluid pressure supplying valves, not shown, for supplying fluid under pressure to the cylinders 31 and 32 in a direction which moves the adhesive applicator roll 27 into operative position. Hence, as the conveyor belts 17 and 22 operate, the hose lining tube 10 is carried through a complete cycle, as measured from the point just in advance of the work station, and during this travel the outer surface of the tube 10 has an adhesive, such as rubber cement, applied thereto by the applicator roll 27.

When the leading edge of the tube 10 has returned to the work station, adjacent the forward end of the strip applicator mechanism, the operator stops the conveyors by pressing the button 26 and moves the applicator roll for the adhesive into inoperative position by actuating the switch 30. He then lowers the strip applicator and guiding mechanism to operative position, as shown in FIGS. 4, 5 and 6, and applies the forward free ends of the fabric strips 11 and 12 to the tube 10 adjacent the edges thereof with the outer edges of the strips 11 and 12 extending outwardly of the tube and resting upon the upper surface of the conveyor 17. The free edge of the strip of elastomeric material 13 is then applied to the portion of the tube intermediate the strips 11 and 12 and to the adjacent edges of these strips. This operation can be facilitated by momentary actuation of the conveyor start button 25 and almost immediately stopping of the conveyor through actuation of the button 26 to thus move the hose liner 10 the short distance sufficient to bring the forward edges of the fabric strips 11 and 12 beneath the point of application of the elastomeric strip 13.

The operator now again presses the start button 25 so that the conveyor 17 carries the hose liner 10 beneath the strip applicators thereby progressively, simultaneously applying two fabric strips to the edges of the tube 10 and affixing thereover the elastomeric strip 13. The application of these strips is substantially without tension thereon since, as has been explained in conjunction with the description of the details of the apparatus, the strip materials are supplied in sufficient quantity to be slightly in excess of the rate of utilization and the utilization of the strips is not dependent upon to remove the materials from their supply rolls by direct pull through the strips upon the rolls. Instead, removal of the strips from this supply rolls is performed by the stripper rolls which are positively driven as will now be apparent.

When the conveyor 17 has conducted the entire length of the tube 10 beneath the strip applicator mechanism, the conveyor is stopped, the strips 11, 12 and 13 are severed and the applicator mechanism is again tilted to an inoperative position. The leading edge of the tube 10 is then unclamped and it, with the attached strips 11, 12 and 13, is inverted. The leading edge of the lining tube is again clamped to the conveyor in this inverted position, the operator restarts the conveyor 17, and again actuates the adhesive applicator to operative position by pressing the start button 29. The operator completes the turning of the tube as it moves past the work station, this operation being performed by hand or by a suitably shaped sheet metal guide as may be desired. The tube and strips now occupy the position on the conveyor shown to the right in FIG. 8 and, as the conveyor carries the tube and strips in this position, adhesive is now applied to the outermost face of the tube 10 which is the opposite face to that on which adhesive had previously been supplied.

Figure 8:
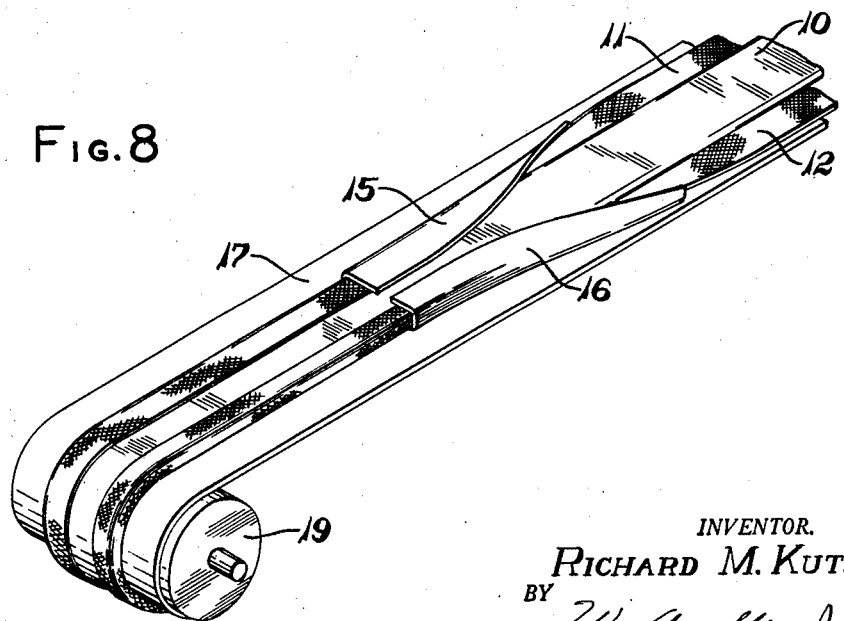
FIG. 8 is a fragmentary perspective view showing the procedure for folding the fabric strips around the edges of the lining tube.

When the now adhesively coated tube 10 again passes the work station, the laterally extending edges of the fabric strips 11 and 12 are folded onto the outer surface of tube 10, this being effected by suitably shaped folding forms 15 and 16, see FIG. 8, which may be manually held by the operator or may be actuated into position by power means if desired. The folding of the extending edges of the strips 11 and 12 is completed and these are firmly engaged with the tube 10 by passage of the tube and strips over the convex surface provided by the head pulley 19 of the conveyor. As the conveyor again returns the tube and strips to the work station with the edges of the fabric strips 11 and 12 now folded upon the tube 10, the conveyor is again stopped with the leading edge of the tube at the work station.

The strip applicator and guiding mechanism are now restored to operative position but the free ends of the fabric strips 11 and 12 are not now contacted with the tube 10. Instead, only the strip of elastomeric material is contacted with the tube 10 and the edges of the strips 11 and 12. The operator again starts the conveyor 17 so that the tube 10 moves beneath the strip applicator mechanism and during this operation only the elastomeric material is applied, corresponding to the strip 14 in FIG. 1. Fabric strip material is not fed since, although the friction wheels 40, 41 of the fabric strip mechanism are driving the stripper rolls of that mechanism, the fabric strip material hanging in loops beneath the stripper rolls 37 and 38 are not pulled into contact with the latter since the ends of the strips are not now attached to the tube 10.

When the entire length of the tube 10 has received the final strip 14 of elastomeric material, this is severed and the strip applicating mechanism is again tilted to inoperative position, it being understood that this operation is performed after the conveyor has again been stopped. The operator now unclamps the end of the tube, which will have the appearance in section as shown in FIG. 1, and this may be removed from the apparatus by again operating the conveyor 17 while coiling the tube 10 upon a suitable form or roll, not shown, with the tube protected by a liner or by dusting to prevent inadvertent adhesion between the convolutions, it being remembered that the hose has not yet been completed by curing.

The product thus made by the method just described is then provided with the woven or knit fabric cover or jacket in a manner, not shown, but which is conventional in the manufacture of hose of this type and the hose is cured by subjecting it to heat and pressure in the well-known manner. Such a hose may be repeatedly stored in flat condition, when not in use, or expanded to full circular cross section, in use, without injury in the same manner as similar hose heretofore made by entirely manual operation. The hose produced by this method will, however, be found to be superior to such manually made hose in that the strength will be more uniform throughout since the fabric reinforcing strips are supplied uniformly without tension and the various components are more accurately located without wrinkles or buckling of materials and so that there is the proper margins of overlap of the strips, such as 11, 12, 13 and 14. Moreover, the method of this invention permits the forming of hose of this type several times faster than by prior methods and with less effort by the operator.

The invention has been described with respect to the manner in which the method is performed by use of one specific embodiment of apparatus. This is solely for the sake of brevity and it will be apparent that the method may be effected by other apparatus. By way of example, but without limitation thereto, some of the variations may comprise the provision of the elastomeric strip guiding mechanism separate from that for the fabric strips so that these strip guiding mechanisms may be independently moved to and from operative positions. Also, the elastomeric strip supplying mechanism may be so formed that the supply rolls and take-up rolls are provided on a turnstile arrangement so that successive rolls can be immediately swung to operative position as the preceding supply roll is depleted. Also, the method of this invention may be performed without the necessity of operating the conveyor 17 through a complete cycle in each step of the procedure by providing a conveyor of suitable length together with adhesive application and strip supplying mechanisms such that all operations can be performed upon the liner tube during a single complete cycle of the conveyor operation. Conversely, a plurality of separate conveyors may be employed with the several procedural steps effected at appropriate times during movement of the tube past suitably located successive work stations. These and other variations of the invention, which will be readily apparent to those skilled in the art, are considered as coming within the ambit of this invention, the scope of which is defined in the appended claims.

Having thus described the invention, I claim:

1. In the method of making flexible hose the steps comprising providing a flattened tube of elastomeric material, simultaneously longitudinally applying two strips of fabric material to one face of said tube with the adjacent edges of the strips laterally spaced from each other and with the opposite edges of the strips extending beyond the edges of the tube, applying a strip of elastomeric material to the adjacent edges of said fabric strips and the portion of said tube intermediate said strips, moving the said tube and strips over a convex surface with the said strips between the surface and tube while deflecting the fabric strips laterally of the tube to fold them around the tube, and then applying a strip of elastomeric material to the folded edges of the fabric strips and the portion of the tube therebetween on the other face of the tube.

2. In the method of making flexible hose the steps comprising providing a flattened tube of elastomeric material, applying an adhesive to one face of said tube, simultaneously applying two strips of fabric material longitudinally to the said one face of the tube with the adjacent edges of the strips laterally spaced from each other and with the opposite edges of the strips extending beyond the edges of the tube, applying a strip of elastomeric material to the adjacent edges of said fabric strips and the portion of said tube intermediate said strips, applying an adhesive to the other face of said tube, moving the said tube and strips over a convex surface with the said strips between the surface and tube while deflecting the fabric strips laterally of the tube to fold them around the tube, and then applying a strip of elastomeric material to the folded edges of the fabric strips and the portion of the tube therebetween on the said other face of the tube.

3. In the method of making flexible hose the steps comprising providing a flattened tube of elastomeric material, moving said tube in the direction of its length and relative to a work station, progressively longitudinally applying two separate fabric strips simultaneously to one face of said tube as it moves past said work station, the adjacent edges of said strips being laterally spaced from each other and the outer edges of said strips extending beyond the edges of said tube, applying a strip of elastomeric material to the said adjacent edges of said fabric strips and the portion of said tube intermediate said strips as the tube leaves said work station, moving the said tube and strips in the directions of their lengths while deflecting the fabric strips laterally of the tube to fold them around the tube, again moving said tube and strips lengthwise past said work station and while so moving the tube applying a strip of elastomeric material to the folded edges of the fabric strips and the portion of the tube therebetween on the other face of the tube.

4. In the method of making flexible hose the steps comprising securing one end of an elongated tube of elastomeric material in flattened condition to an endless conveyor, moving the conveyor to dispose the tube on the conveyor and during the movement of the latter applying an adhesive to the outer face of the said tube, longitudinally applying two fabric strips simultaneously to the adhesively coated face of said tube with the adjacent edges of the strips laterally spaced from each other and the opposite edges of the strips extending beyond the edges of the tube and supported upon the conveyor, applying an elongated strip of elastomeric material to the adjacent edges of said fabric strips and the portion of the outer face of the tube between the strips during conveyor movement, releasing the secured end of the tube from the conveyor and inverting it, resecuring the end of the tube to the conveyor and turning the tube progressively along its length as the conveyor is moving so that the said fabric and elastomeric strips are positioned between the tube and the conveyor, applying adhesive to the face of the tube which has been turned outermost during movement of the conveyor and folding the extending edges of the fabric strips upon the said tube during that movement, applying a second strip of elastomeric material to the folded fabric strips and the portion of said tube therebetween as the conveyor continues its movement, and then releasing the tube and removing it from the conveyor.

5. A method of making flexible hose comprising securing one end of an elongated tube of elastomeric material in flattened condition to an endless conveyor, moving the conveyor to dispose the tube on the conveyor and during the movement of the latter applying an adhesive to the outer face of the said tube, simultaneously progressively applying two fabric strips longitudinally on the adhesively coated face of said tube with the adjacent edges of the strips laterally spaced from each other and the opposite edges of the strips extending beyond the edges of the tube and supported upon the conveyor as the latter is moved, progressively applying an elongated strip of elastomeric material to the adjacent edges of said fabric strips and the portion of the outer face of the tube between the strips as the latter are applied, releasing the secured end of the tube from the conveyor and inverting it, resecuring the end of the tube to the conveyor and operating the conveyor while turning the tube progressively along its length so that the said fabric and elastomeric strips are positioned between the tube and the conveyor, applying adhesive to the face of the tube which has been turned outermost during movement of the conveyor and folding the extending edges of the fabric strips upon the said tube, progressively applying a second strip of elastomeric material to the folded fabric strips and the portion of said tube therebetween as the conveyor continues its movement, then releasing the tube and removing it from the conveyor, inserting the tube within a fabric jacket and then curing the hose by subjecting it to heat and pressure.

6. In the method of making flexible hose the steps comprising securing one end of an elongated tube of elastomeric material in flattened condition to an endless conveyor, moving the conveyor through one complete cycle and during that movement applying an adhesive to the outer face of the said tube, operating the conveyor through a second complete cycle and simultaneously applying two fabric strips longitudinally on the outer face of said tube with the adjacent edges of the strips laterally spaced from each other and the opposite edges of the strips extending beyond the edges of the tube and supported upon the conveyor, applying an elongated strip of elastomeric material to the adjacent edges of said fabric strips and the portion of the outer face of the tube between the strips during said second cycle of conveyor movement, releasing the secured end of the tube from the conveyor and inverting it, resecuring the end of the tube to the conveyor and operaing the conveyor through a third complete cycle while turning the tube progressively along its length so that the said fabric and elastomeric strips are positioned between the tube and the conveyor, during the said third cycle of conveyor operation applying adhesive to the face of the tube which is then outermost, again operating the conveyor through a complete cycle and during this latter cycle folding the extending edges of the fabric strips upon the said tube, applying a second strip of elastomeric material to the folded fabric strips and the portion of said tube therebetween as the conveyor moves through another complete cycle, releasing the tube from the conveyor, and operating the conveyor to deliver the tube therefrom.

(References on following page)

References Cited in the file of this patent

UNITED STATES PATENTS

| | | |
|---|---|---|
| 710,688 | Heyl-Dia | Oct. 7, 1902 |
| 1,220,288 | Subers | Mar. 22, 1917 |
| 1,639,408 | Jaquith et al. | Aug. 16, 1927 |
| 1,763,106 | Snyder | June 10, 1930 |
| 1,906,320 | Lammertse et al. | May 2, 1933 |
| 2,528,409 | Asher | Oct. 31, 1950 |
| 2,612,910 | Krupp | Oct. 7, 1952 |
| 2,696,865 | Seiler | Dec. 14, 1954 |
| 2,732,882 | Kuts | Jan. 31, 1956 |
| 2,732,884 | Vanzo | Jan. 31, 1956 |

FOREIGN PATENTS

| | | |
|---|---|---|
| 210,425 | Australia | Sept. 11, 1957 |
| 264,221 | Great Britain | Jan. 13, 1927 |